Figure 1:
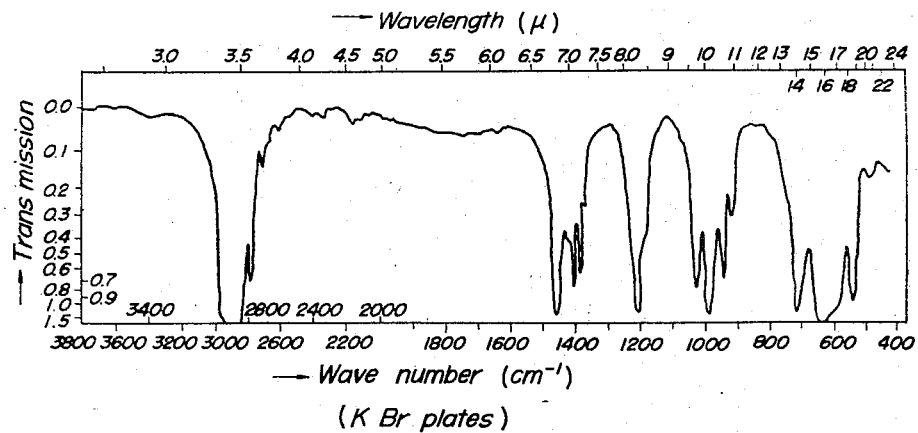

(K Br plates)

United States Patent Office 3,293,228
Patented Dec. 20, 1966

3,293,228
METHOD FOR PRODUCING α-OLEFIN POLYMERS UTILIZING TITANIUM TRICHLORIDE AND AN ANTIMONY-ALUMINUM COMPLEX AS THE CATALYST
Yukichi Takashi and Itsuho Aishima, Nobeoka-shi, and Yuji Kobayashi and Yoshio Tsunoda, Tokyo, Japan, assignors to Asahi Kasei Kogyo Kabushiki Kaisha, a corporation of Japan
Filed Sept. 20, 1962, Ser. No. 224,963
14 Claims. (Cl. 260—93.5)

This invention relates to a method for producing α-olefin polymers having high crystallinity by use of a novel catalyst.

An object of the present invention is to provide a novel catalyst capable of producing α-olefin polymers having high stereo-regularity.

Another object is to provide a method of polymerization for producing α-olefin polymers having high stereo-regularity by using said novel catalyst.

A further object of the present invention is to provide α-olefin polymers having structures of high stereo-regularity, capable of producing fibers, films and molded articles of excellent properties, in spite of using the polymerization products as they are without purification such as extraction or fractional dissolution.

A known process for producing crystalline polymers from α-olefins, is disclosed in Natta et al., Japanese patent publication No. 10,596/57. Therein, linear polymers of α-olefins having specific stereo-structures are obtained by use of catalysts comprising (I) a compound of a metal belonging to Groups IV–A to VI–A of the Periodic Table including thorium and uranium, and (II) a metal belonging to Groups II and III of the Periodic Table, an alloy thereof, a hydride or an organometallic compound of a metal belonging to Groups I to III of the Periodic Table. Subsequently, the patentees discovered that, in case of polymerizing α-olefins by use of the aforesaid catalysts, the use of a solid and insoluble catalyst comprising triethyl aluminum and titanium trichloride, for example, results in the formation of stereo-specific polymers having a markedly high crystallinity, isotactic structure, and high molecular weights (Japanese patent publication No. 2,489/59).

The latter invention was significant and was far beyond the invention disclosed in the aforesaid Japanese patent publication No. 10,596/57. However, even when the polymerization of α-olefins, propylene for example, is carried out according to said process, the ratio of isotactic polymers having stereo-regularity, represented by the ratio of n-heptane extraction residue, is less than 80% (refer to Japanese patent publication No. 2,489/59). Therefore the resulting product contains a considerably large amount of non-crystalline polymers (atactic and stereo-block polymers), which are considered to have irregular structures. Fibers produced from polymers containing isotactic polymers of such a low extent give a waxy touch, as disclosed in Japanese patent publication No. 4,722/60 by the inventors themselves. This has been a great obstacle in practical use. In order to overcome said drawback, Natta et al. have reported in Japanese patent publication No. 4,895/60 that when the polymers obtained are subjected to extraction with an organic solvent, 2-ethyl hexane for example, to remove non-crystalline atactic polymers, it is possible to produce excellent fibers, films and the likes.

The present inventors have provided a method for manufacturing crystalline polymer having a higher stereo regularity which produces a superior fiber or film when it is used as is without such treatments as extraction or fractional dissolution.

That is to say, the present invention relates to a method for producing poly-α-olefins having high stereo-specificity by polymerizing α-olefin in the presence of a catalyst obtained by reacting [A] TiCl$_3$ with [B] one or more members selected from the organo-metallic complexes having the following general formulae:

(I) SbR$_4$XAl$_2$R′$_6$, wherein X is one member selected from the group consisting of Cl and Br; R is an ethyl group; and R′ is the same or different alkyl groups having 2 to 6 carbon atoms, but such alkyl groups having 4 or more carbon atoms should be limited to 3 or less in number.

(II) SbR$_3$R″XAl$_2$R′$_5$X′, wherein X and X′ are the same or different halogens selected from the group consisting of Cl and Br; R is an ethyl group; R′ is the same or different alkyl groups having 2 to 6 carbon atoms: but such alkyl groups having 5 or more carbon atoms should be limited to 2 or less in number; and R″ is an alkyl group having 2 to 6 carbon atoms.

(III) SbR$_4$XAlR′$_n$X′$_{3-n}$, wherein X and X′ are the same or different halogen atoms selected from the group consisting of Cl, Br, and I; R and R′ are the same or different alkyl groups having 1 to 6 carbon atoms; and $n$ is 1, 2 or 3.

It is a marked characteristic of the present invention that when α-olefins are polymerized in accordance with the present invention, highly crystalline polymers having isotactic structure are obtainable. For example, in the case of polymerizing propylene, a conventional catalyst comprising Al(C$_2$H$_5$)$_3$ and TiCl$_3$ gives polymers having isotacticity (represented by the ratio of an extraction residue to the initial substance after the extraction of 24 hours with boiling n-heptane by using Soxhlet extractor; hereinafter referred to as n-heptane extraction residue) of as low as about 70–80%, whereas the present novel catalyst gives polypropylene having isotacticity of more than 90%.

Another marked characteristic of the present invention is that when the polymerization of α-olefins, propylene for example, is carried out according to the method of the present invention, the resulting products, such as fibers, films or molded articles, obtained by using the polymerization products without any particular treatment such as extraction or fractional dissolution, are nearly free from waxy touch and are sufficiently satisfactory.

Further, it is one of the characteristics of the present invention that the catalysts employed in the present invention have such high polymerization activity that α-olefins can be polymerized at a high polymerization rate. Namely, the present catalysts show such a high activity that in case of the polymerization of α-olefins, for example propylene, under a partial pressure of 3 kg./cm.$^2$, it is possible to obtain polypropylene in an amount of 100 to 300 g. per hour per gram of titanium trichloride.

The organo-metallic complexes containing antimony and aluminum employed in the present invention are represented, as mentioned above, by the general formulae (I) SbR$_4$XAl$_2$R′$_6$, (II) SbR$_3$R″XAl$_2$R′$_5$X′ and (III)

$SbR_4XAlR'_nX'_{3-n}$. For example, the effective complexes are:

$Sb(C_2H_5)_4ClAl_2(C_2H_5)_5Cl$,
$Sb(C_2H_5)_4BrAl_2(C_2H_5)_5Cl$,
$Sb(C_2H_5)_4BrAl_2(C_2H_5)_5Br$,
$Sb(C_2H_5)_3(i-C_3H_7)ClAl_2(i-C_3H_7)_5Cl$,
$Sb(C_2H_5)_3(C_6H_{13})ClAl_2(C_2H_5)_3(C_6H_{13})_2Cl$,
$Sb(C_2H_5)_4ClAl_2(C_2H_5)_6$,
$Sb(C_2H_5)_4BrAl_2(C_2H_5)_6$,
$Sb(C_2H_5)_4ClAl_2(i-C_3H_7)_6$,
$Sb(C_2H_5)_4ClAl_2(C_2H_5)_3(i-C_3H_7)_3$,
$Sb(C_2H_5)_4ClAl_2(C_2H_5)_3(C_6H_{13})_3$,
$Sb(C_2H_5)_4ClAl_2(C_2H_5)_3(i-C_4H_9)_3$,
$Sb(C_2H_5)_4ClAl(C_2H_5)Cl_2$,
$Sb(C_2H_5)_4ClAl(C_2H_5)_2Cl$,
$Sb(C_2H_5)_4ClAl(C_2H_5)_3$,
$Sb(C_2H_5)_4IAl(C_2H_5)_3$, and
$Sb(C_4H_9)_3(C_2H_5)BrAl(C_3H_7)_3$.

Processes for synthesizing these organo-metallic complexes used in this invention are:

(1) A process for preparing the Complex I by reacting tetra-alkyl stibonium halide with trialkyl aluminum.

(2) A process for obtaining the Complex II by reacting tetra-alkyl stibonium halide with dialkyl aluminum halide and trialkyl aluminum.

(3) A process for producing the Complex II by reacting antimony trichloride with trialkyl aluminum.

(4) A process for preparing the Complex III by reacting tetraalkyl stibonium halide with alkyl aluminum dihalide, dialkyl aluminum halide or trialkyl aluminum.

As a typical example of the organo-metallic complexes containing antimony and aluminum, the details of a method for synthesizing $Sb(C_2H_5)_4ClAl_2(C_2H_5)_5Cl$ and the properties of said complex will be illustrated in the following. For synthesizing this complex, the Process 3 is the most simple and convenient.

Into a 1 l. round-bottomed four-necked flask provided with a mercury sealed stirrer, a dropping funnel, a thermometer and a cooler, 1 mole of antimony trichloride and 300 cc. of dehydrated n-hexane are charged in dried nitrogen atmosphere free from oxygen. 4.5 moles of triethyl aluminum are dropped slowly through the dropping funnel into the flask while refluxing n-hexane. During this time vigorous agitation is continued. The reaction should be carried out under nitrogen atmosphere. The reaction product comprises a powdery black solid and two colorless transparent liquid layers. The solid product is filtered off and the liquid layers are separated to obtain the lower layer. The thus recovered lower layer is extracted with 600 cc. of n-hexane 16 times to remove completely the unreacted organo-aluminum compound. On stripping the n-hexane, 240 g. of n-hexane-insoluble colorless liquid substance is isolated. The reaction product thus obtained fumes or fires in air and explodes on contact with water and air. The infrared absorption spectrum of this substance is shown in FIG. 1, and the analytical results and physical properties are shown in Tables 1 and 2, respectively.

Note (1): Following analytical method was adopted: After the decomposition of a part of the sample with an aqueous solution of potassium permanganate and sulfuric acid, Sb was analyzed quantitatively by using $KMnO_4$-titration method and Al was analyzed by using oxine method. The other part of the sample was decomposed with water and the chlorine content was analyzed by using Vorhard's method. Finally, carbon and hydrogen were quantitatively analyzed by using an ordinary micro-combustion method.

(2) The content of the active ethyl groups was calculated from the ethane gas evolved at hydrolysis. The theoretical values were calculated on the assumption that one molecule contains 5 active ethyl groups. It was also confirmed by gas-chromatographic analysis that the evolved gas contained was, in most part, ethane though it contained a slight amount of hydrogen and ethylene.

TABLE 2

| | | |
|---|---|---|
| $D_4^{35}$ | 1.112 | Measured by a pycnometer. |
| $n_D^{35}$ | 1.4995 | Measured by Abbe's refractometer. |
| M.W. | 542; theoretical value: 508.17. | Measured according to cryoscopic method by using benzene solution. |

Figure 2:
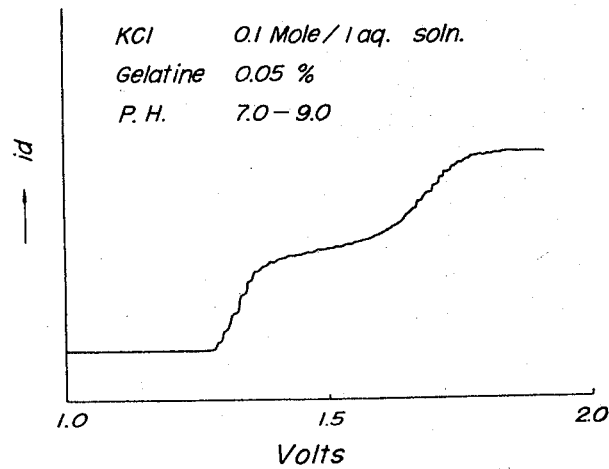

Further, the presence of $Sb(C_2H_5)_4^+$ ion was confirmed after the hydrolysis by measuring the polarogram of the hydrolyzates (refer to the accompanying FIGURE 2.)

The number of active ethyl groups and the presence of $Sb(C_2H_5)_4^+$ show the fact that the complex thus synthesized has the structure $Sb(C_2H_5)_4ClAl(C_2H_5)_5Cl$. The characteristics of the thus obtained organo-metallic complex, $Sb(C_2H_5)_4ClAl_2(C_2H_5)_5Cl$, are that it is a colorless transparent liquid and is substantially insoluble in lower aliphatic hydrocarbon, such as n-hexane, which is recommended as a polymerization medium.

As mentioned before, even though the washing of the produced $SbAl_2(C_2H_5)_9Cl_2$ was repeated many times with n-hexane, the weight of residue does not decrease. In order to confirm this property quantitatively, $Sb(C_2H_5)_4ClAl_2(C_2H_5)_5Cl$ labelled with $^{124}Sb$ was synthesized and its solubility in various hydrocarbons was examined but the solubility of this complex in n-hexane was nondetectable.

Table 3.—Solubility of $Sb(C_2H_5)_4ClAl_2(C_2H_5)_5Cl$ in various hydrocarbons

Hydrocarbons: Solubility, Percent
n-Hexane _____ Non-detectable.
n-Heptane _____ ≈0.05.
n-Octane _____ ≈0.1.

NOTE.—In n-heptane and n-octane soluble parts, Al was detected in an amount corresponding to 2 mole against 1 mole of Sb.

Such properties can not be observed in liquid Sb and Al compounds known at present. This fact shows that the catalyst system employed in the present invention is substantially different from the conventional one, which contains soluble alkyl aluminum and the like as catalyst components. Furthermore, in order to compare the properties of Al and Sb atoms and of $C_2H_5$ groups in the complex $Sb(C_2H_5)_4ClAl_2(C_2H_5)_5Cl$ with those in well-known liquid aluminum and antimony compounds, respective nuclear magnetic resonance adsorptions were examined. The results are shown in Table 4.

TABLE 1.—ANALYTICAL RESULTS

| | Sb | Al | C | H | Cl | Total | $(C_2H_5)$ active |
|---|---|---|---|---|---|---|---|
| Calc'd for $SbAl_2(C_2H_5)_9Cl_2$, percent | 23.96 | 10.62 | 42.54 | 8.93 | 13.96 | 100.00 | 28.6 |
| Found, percent | 24.91 | 10.33 | 42.77 | 9.00 | 13.96 | 100.37 | 28.0 |

TABLE 4.—NUCLEAR MAGNETIC RESONANCE ADSORPTION DATA OF Sb(C₂H₅)₄ClAl₂(C₂H₅)₅Cl AND VARIOUS ALUMINUM AND ANTIMONY COMPOUNDS

| Compound | Aluminum | | | Antimony | | |
|---|---|---|---|---|---|---|
| | Proton chemical shifts in c.p.s. | | Electronegativity | Proton chemical shifts in c.p.s. | | Electronegativity |
| | $\diagdown$CH₂$\diagup$ | —CH₃ | | $\diagdown$CH₂$\diagup$ | —CH₃ | |
| (C₂H₅)₃Sb | | | | ~105.3 | ~105.3 | 1.76 |
| (C₂H₅)₂AlCl | 34.0 | 80.5 | 1.20 | | | |
| (C₂H₅)₃Al | 39.8 | 84.8 | 1.27 | | | |
| Sb(C₂H₅)₄ClAl₂(C₂H₅)₅Cl | 36.0 | 93.7 | 1.01 | 181.8 | 122.0 | 2.46 |

NOTE.—The Huggins' electronegativity was calculated by using the difference between CH₂ and —CH₃ shifts (Δ in c.p.s.) at 60 mc. according to the revised Dailey and Shoolery equation [J. R. Cavanaugh and B. P. Dailey, J. Chem. Phys., 34, 1101, (1961)]. Namely, the electronegativity $\epsilon = 0.0114\Delta + 1.78$.

As shown in Table 4, the electronegativity of Al atoms, which constitute the complex Sb(C₂H₅)₄ClAl₂(C₂H₅)₅Cl, is lower than that of (C₂H₅)₂AlCl or (C₂H₅)₃Al. Therefore, it is recognized that the environment of the ethyl groups linked to Al of the complex is different from that of others.

The synthesis Process 3, mentioned before in detail as a process for synthesizing the complex $$Sb(C_2H_5)_4ClAl_2(C_2H_5)_5Cl$$

is the most simple and convenient method for synthesizing the Complex II, all alkyl groups of which are the same. It is also possible, however, to synthesize the various complexes by using tetraalkyl stibonium salt as a starting material [Processes (1), (2) and (4)]. In order to show concrete techniques of the precesses, the process for synthesizing Sb(C₂H₅)₄ClAl(C₂H₅)Cl₂ is mentioned, as an example in the following (Process (4)):

Into a 100 cc. four-necked flask, 13.7 g. (0.05 mole) of Sb(C₂H₅)₄Cl crystals are charged under nitrogen atmosphere together with 100 cc. of n-hexane. 6.35 g (0.05 mole) of Al(C₂H₅)Cl₂ dissolved in 40 cc. of n-hexane is dropped in the flask to react therewith, while maintaining the inner temperature at —50° C. After the dropping is completed, the temperature is gradually elevated to 50° C. and the agitation is continued for about 30 minutes to complete the reaction. Subsequently, the content is repeatedly washed with dried n-hexane. By cooling the content after stripping off n-hexane, 20 g. of colorless crystals (M.P. 34–39° C.) are isolated. The analytical values shown in the following coincided with the chemical formula Sb(C₂H₅)₄ClAl(C₂H₅)Cl₂.

TABLE 5

| | Sb | Al | Cl | C | H |
|---|---|---|---|---|---|
| Found, percent | 29.69 | 6.59 | 26.90 | 28.49 | 5.96 |
| Calc'd, percent | 30.41 | 6.74 | 26.57 | 29.97 | 6.29 |

The synthesis Processes 1 and 2 can be conducted by using the same techniques as the Process 4. According to these four processes, it is possible to synthesize all the organo-metallic complexes containing Sb and Al which are used in the present invention. In the case of any complex containing both Al and Sb, the complex has the essentially different properties from its starting material such as tetraalkyl stibonium salt, antimony trichloride and organo-aluminum compound. The typical example of aforesaid differences is as follows. That is, as described in detail in Example 21, it is an unexpected fact that the catalyst prepared by reacting $$Sb(C_2H_5)_4ClAl(C_2H_5)Cl_2$$

with TiCl₃ is able to polymerize propylene even at low temperature to nearly perfect isotactic high polymer.

On the other hand, it is a fact that the starting material for synthesizing Sb(C₂H₅)₄ClAl(C₂H₅)Cl₂, such as Sb(C₂H₅)₄Cl and Al(C₂H₅)Cl₂, could not give the effective catalyst for the polymerization of propylene even in combination with TiCl₃. (Refer to referential Example 1 of Japanese patent publication No. 20,743/61 by Eastman Kodak Co.)

This shows that the nature of the chemical bond in Sb(C₂H₅)₄ClAl(C₂H₅)Cl₂ is entirely different from that in Sb(C₂H₅)₄Cl or Al(C₂H₅)Cl₂.

There have been proposed many processes for preparing the titanium trichloride such as, for example, by reducing titanium tetrachloride with hydrogen or with metallic aluminum in the presence of a small amount of aluminum chloride. The titanium trichloride thus obtained can be employed in the present invention.

In embodying the present invention, the desirable amount of titanium trichloride employed is 0.0001–0.05 mole per mole of α-olefin to be polymerized, and it is recommended to use 0.1–10 moles of said complexes containing antimony and aluminum per mole of said titanium trichloride. The amount of complex required depends upon the amount of titanium trichloride employed. In case of using a large amount of titanium trichloride, a sufficient catalyst activity may be obtained by using a small amount of complex per mole of the titanium trichloride, whereas in case of employing a small amount of titanium trichloride, the complex should be used at a higher ratio.

In order to make such behavior clearer, the method is illustrated as follows with reference to the following examples.

Table 6 shows an example of the polymerization of 1 mole of propylene in n-hexane, using a large amount of titanium trichloride, according to exactly the same process as in Example 1.

TABLE 6

| Experiment No. | TiCl$_3$, mol | SbEt$_4$ClAl$_2$Et$_5$Cl/TiCl$_3$, molar ratio | Temp., °C. | Time, hr. | Polymer yield, percent | [$\eta$] (g./100 cc.)$^{-1}$ | n-Heptane residue, percent |
|---|---|---|---|---|---|---|---|
| 1 | 0.0050 | 0.03 | 60 | 17 | 0 | | |
| 2 | 0.0050 | 0.07 | 60 | 17 | 0 | | |
| 3 | 0.0050 | 0.12 | 60 | 2 | 100 | 6.09 | 90.3 |

As evident from the above table, although the polymerization is carried out with a comparatively large amount of TiCl$_3$ (0.005 mole per 1 mole of monomer), polymerization could not be observed by using less than 0.10 mole of complex and polymerization could proceed only by using more than 0.1 mole of complex. Further, in case the polymerization is carried out by use of a small amount of TiCl$_3$, the amount of complex required per mole of TiCl$_3$ increases. It is meaningless, however, to use the complex in an amount larger than required.

Table 7 shows the results of experiments effected on the polymerization of propylene in xylene, in accordance with the process described in detail in Example 2, using 2 m. moles of titanium trichloride per litre of xylene and varying the amount of complex added.

inert to each of the catalyst components, such as, for example, n-hexane, n-heptane, benzene, xylene or cyclohexane. The ratio of the solvent used to α-olefin may optionally be decided depending on the modes of polymerization. Ordinarily, however, it is appropriate to use less than 20 parts by weight of the solvent per part by weight of α-olefin.

Also, in the practice of the present invention, the polymerization temperature for obtaining an excellent polymer having high molecular weight is 15° to 120° C., preferably 40° to 80° C. Further, the polymerization pressure may also be selected freely. The object of the invention may, however, be sufficiently achieved at 1 to 30 atmospheric pressures, ordinarily at 1 to 10 atmospheric pressures.

TABLE 7

| Experiment No. | TiCl, m. mol/l. | SbEt$_4$ClAl$_2$Et$_5$Cl/TiCl$_3$, molar ratio | C$_3$H$_6$ partial pressure, kg./cm.$^2$ | Temp., °C. | Time, hr. | Polymer, gr. | [$\eta$] (g./100 cc.)$^{-1}$ | n-Heptane residue, percent |
|---|---|---|---|---|---|---|---|---|
| 1 | 2 | 1.0 | 5.0 | 60 | 2.0 | 34.0 | 10.31 | 92.9 |
| 2 | 2 | 1.5 | 5.0 | 60 | 2.0 | 48.0 | 11.08 | 94.5 |
| 3 | 2 | 2.0 | 5.0 | 60 | 2.0 | 51.2 | 13.60 | 95.0 |
| 4 | 2 | 3.0 | 5.0 | 60 | 2.0 | 72.3 | 10.07 | 95.0 |
| 5 | 2 | 5.0 | 5.0 | 60 | 2.0 | 78.9 | 10.67 | 94.6 |
| 6 | 2 | 10.0 | 5.0 | 60 | 2.0 | 99.0 | 8.45 | 93.9 |
| 7 | 2 | 13.0 | 5.0 | 60 | 2.0 | 101.0 | 8.39 | 93.7 |

As is clear from the above table, the polymer yield increases according as the increase of the molar ratio of the complex/TiCl$_3$. However, even when more than 10 moles of the complex are added per mole of TiCl$_3$, there are observed neither a marked increase in yield no variations in isotacticity of the polymer. Therefore, it is meaningless to use the complex in an amount of more than 10 moles per mole of TiCl$_3$.

The present invention is applicable to the polymerization of α-olefins, such as propylene, butene-1, pentene-1, 3-methyl-butene-1, 4-methyl-pentene-1 and styrene, and in either case, it is possible to obtain a polymer having high crystallinity.

In the cases of propylene and butene-1, it is desirable to use the monomers as pure as possible, but relatively low purity monomers, e.g., about 80% purity, containing inert gases are also available.

In practicing the present invention, a reaction medium may or may not be employed, and the preferable reaction medium is an aliphatic, alicyclic or aromatic hydrocarbon In order to clarify the effects and characteristics of the polymerization carried out in accordance with the present invention, comparative experiments were carried out, using the same finely powdered, TiCl$_3$. The polymerization effect of employing said complex Sb(C$_2$H$_5$)$_4$ClAl$_2$(C$_2$H$_5$)$_6$ or Sb(C$_2$H$_5$)$_4$BrAl$_2$(C$_2$H$_5$)$_6$ was compared with the case using Al(C$_2$H$_5$)$_3$ as described in the specification of said Japanese patent publication No. 2,489/60. The results are shown in the following table.

TABLE 8

| | Referential example | Example 3 | Example 4 |
|---|---|---|---|
| Catalyst composition: | | | |
| TiCl$_3$ (m. mole) | 1.0 | 1.0 | 1.0 |
| Al(C$_2$H$_5$)$_3$ (m. mole) | 5.0 | | |
| Sb(C$_2$H$_5$)$_4$ClAl$_2$(C$_2$H$_5$)$_6$ (m. mole) | | 2.5 | |
| Sb(C$_2$H$_5$)$_4$BrAl$_2$(C$_2$H$_5$)$_6$ (m. mole) | | | 2.5 |
| Reaction medium: Xylene (ml.) | 500 | 500 | 500 |
| Polymerization condition: | | | |
| Partial pressure of propylene (kg./cm.$^2$) | 5.0 | 5.0 | 5.0 |
| Temperature (° C.) | 55 | 55 | 55 |
| Time (hr.) | 2.0 | 2.0 | 2.0 |
| Rate of polymerization (g. polymer/g. TiCl$_3$ hr.) | 230 | 300 | 250 |
| Intrinsic viscosity (g./100 cc.)$^{-1}$ | 3.05 | 9.76 | 9.23 |
| n-Heptane residue (percent) | 65.5 | 91.4 | 90.3 |

It is clear from the above table that a comparison, carried out under the same conditions, between the polymerization of propylene according to the conventional process and the same polymerization conducted by use of the catalysts of the present invention shows that the ratio of isotactic polymer, represented by the n-heptane extraction residue, obtained in accordance with the present invention is improved by as much as 30%.

In the following, the present invention will be more fully illustrated referring to examples, but these examples do not limit the scope of the present invention.

Example 1

Into a 300 cc. stainless steel autoclave 150 cc. of n-hexane was charged and then 0.62 m. mole of finely powdered titanium trichloride, obtained by reducing titanium tetrachloride with hydrogen, was added under a dried oxygen free nitrogen atmosphere. Subsequently, 1.07 m. mole of $Sb(C_2H_5)_4ClAl_2(C_2H_5)_5Cl$ synthesized according to the process described in the body of the present specification was added and the autoclave was closed. The analytical values and physical properties of the above-mentioned complex were as follows—

Analytical values:

|  | Sb | Al | C | H | Cl |
|---|---|---|---|---|---|
| Calc'd (percent) | 23.96 | 10.62 | 42.54 | 8.93 | 13.96 |
| Found (percent) | 23.91 | 10.43 | 42.77 | 9.00 | 13.96 |

Physical properties: $D_4^{35}$, 1.112; $n_D^{35}$, 1.4994.

After agitating the resulting mixture for 30 minutes at room temperature, the autoclave was cooled to −80° C. The autoclave was then evacuated and 0.5 mole of high purity propylene was introduced therein. Subsequently, the autoclave was heated to 60° C. and shaken to carry out the polymerization. The polymerization pressure showed 6.3 kg./cm.² at first, but completely lowered in 3 hours. Basing upon the variation of the polymerization pressure, quantity of the produced polymer per gram of $TiCl_3$ in case of partial pressure of propylene had been kept at 3 kg./cm.² was calculated as high as 230 g. per gram of $TiCl_3$. The residual catalyst in the thus obtained polymerization product was decomposed with 500 cc. of methanol, boiled in 30% hydrochloric acid-methanol, washed with water and dried to obtain 18.8 g. of white powdery polymer. The n-heptane extraction residue of the resulting polymer was 94.5% and the instrinsic viscosity thereof in tetraline solution was 7.99.

Example 2

Into a one litre stainless steel autoclave provided with a magnetic stirrer, 500 cc. of xylene was introduced. Then, 1.0 m. mole of finely powdered $TiCl_3$ and the complex used in Example 1, i.e., $Sb(C_2H_5)_4ClAl_2(C_2H_5)_5Cl$, were charged into the autoclave under a dried nitrogen current free from oxygen, varying the amount of the complex (from 1.0 to 13 m. moles). Immediately after closing, the autoclave was evacuated and heated to 60° C. Subsequently, high purity propylene was introduced therein under pressure so as to maintain its partial pressure at 5 kg./cm.² to carry out the polymerization. After two hour's polymerization, the polymerization product was treated by the same methods as described in Example 1, respectively. In each case, a white powdery polymer showing a high isotacticity was obtained at a high polymerization rate. Yields, n-heptane extraction residues and intrinsic viscosities of respective polymers have been shown in Table 7.

Example 3

In a 20 cc. glass ampoule, 1.0 m. mole of finely powdered $TiCl_3$ and 2.5 m. mole of the complex $$Sb(C_2H_5)_4ClAl_2(C_2H_5)_6$$

synthesized according to the process disclosed in the main body of the present specification, were sealed together with 7 cc. of xylene under a dried oxygen-free nitrogen atmosphere. The analytical values and physical properties of this complex were as follows—

Analytical values:

|  | Sb | Al | C | H | Br |
|---|---|---|---|---|---|
| Calc'd (percent) | 22.29 | 9.87 | 43.97 | 9.23 | 14.63 |
| Found (percent) | 22.46 | 9.86 | 43.56 | 9.07 | 15.21 |

Physical properties: $D_4^{35}$, 1.181; $n_D^{35}$, 1.5125.

This ampoule was placed in a stainless autoclave equipped with a magnetic stirrer and then 500 cc. of purified and dried xylene was added. After evacuating the autoclave, high purity propylene was introduced therein under pressure so as to maintain its partial pressure at 5 kg./cm.². Subsequently, the autoclave was heated to 55° C. and the catalyst ampoule was broken whereby the catalyst was contacted with the monomer to initiate the polymerization reaction. After 2 hours' polymerization, the resulting polymerization product was treated by the same methods as described in Example 1 to obtain 90 g. of a white powdery polymer. The rate of polymerization calculated was 300 g. per hour per gram of $TiCl_3$. The boiling n-heptane extraction residue was 91.4% and the intrinsic viscosity was 9.76.

Example 4

The same polymerization as in Example 3 was repeated except that, in place of $Sb(C_2H_5)_4ClAl_2(C_2H_5)_6$, the complex , synthesized in accordance with the process described in the body of the present specification was employed. The analytical values and physical properties of said complex were as follows—

Analytical values:

|  | Sb | Al | C | H | Br |
|---|---|---|---|---|---|
| Calc'd (percent) | 22.29 | 9.87 | 43.97 | 9.23 | 14.63 |
| Found (percent) | 22.46 | 9.86 | 43.56 | 9.07 | 15.21 |

Physical properties: $D_4^{35}$, 1.181; $n_D^{35}$, 1.5125.

In this case also, as in Example 3, 75 g. of white powdery polymer was obtained and the polymerization rate showed as high as 250 g./g. $TiCl_3$ hr. Its n-heptane extraction residue was 90.3% and its intrinsic viscosity was 9.23.

Example 5

Into two pieces of 10 cc. glass ampoules, 0.6 m. mole of finely powdered $TiCl_3$ and 1.0 m. mole of the complex employed in Example 3, i.e., $Sb(C_2H_5)_4ClAl_2(C_2H_5)_6$, were sealed, respectively. These ampoules were put in a 300 cc. stainless steel shaking type autoclave, which was closed after the addition of 150 cc. of benzene. After the autoclave was cooled to −80° C. and evacuated 0.5 mole of high purity propylene was introduced. The autoclave was then heated to 80° C. and the ampoules were broken whereby the two catalyst components were contacted with each other in the presence of the monomer to start the polymerization. The polymerization was continued for 2 hrs. while shaking the autoclave. The resulting polymerization product was treated by the method as described in Example 1 to obtain 19.8 g. of white powdery polymer. The n-heptane extraction residue of the resulting polymer was 88.9% and the intrinsic viscosity was 7.32.

Example 6

Into two pieces of 10 cc. glass ampoules, 0.6 m. mole of finely powdered $TiCl_3$ and 1.0 m. mole of the complex employed in Example 4, i.e., $Sb(C_2H_5)_4BrAl(C_2H_5)_6$ were sealed, respectively. These ampoules were put in a 300 cc. stainless steel shaking-type autoclave 150 cc. of n-heptane was also added to it. The autoclave was closed, cooled to −80° C. and evacuated. Then, 25 g. of 90% purity propylene, (the remaining components are mainly propane and butane) was introduced. The autoclave was then heated to 40° C. and the ampoules were broken, whereby the two catalyst components were contacted with each other in the presence of the monomer to start the polymerization reaction. The polymerization was continued for 5 hours while shaking the autoclave. The resulting polymerization product was treated by the same methods as in Example 1 to obtain 19.3 g. of white powdery polymer. The n-heptane extraction residue of the resulting polymer was 93.2% and the intrinsic viscosity thereof was 10.35.

*Example 7*

In two pieces of 10 cc. glass ampoules, 0.6 m. mole of finely divided $TiCl_3$ and 1.0 m. mole of the complex $Sb(C_2H_5)_4BrAl_2(C_2H_5)_5Br$, synthesized according to the process of the present invention, were separately sealed. The analytical values and physical properties of said complex were as follows—

Analytical values:

|  | Sb | Al | C | H | Br |
|---|---|---|---|---|---|
| Calc'd (percent) | 20.40 | 9.04 | 36.23 | 7.55 | 26.78 |
| Found (percent) | 19.96 | 9.20 | 36.37 | 7.66 | 26.35 |

Physical properties: $D_4^{35}$, 1.312; $n_D^{35}$, 1.5200.

These ampoules were placed in a 300 cc. stainless steel shaking type autoclave, which was then closed after the addition 150 cc. of n-hexane. After the autoclave was cooled to −80° C. and evacuated, 25 g. of high purity propylene was charged. Subsequently, the autoclave was heated to 55° C. and the ampoules were broken, the polymerization was carried out for 3 hours while shaking the autoclave. The resulting polymerization product was treated by the same methods as in Example 1 to obtain 20.3 g. of white powdery polymer. Its n-heptane extraction residue was 92.5% and its intrinsic viscosity was 9.23.

*Example 8*

The same polymerization of propylene as in Example 7 was repeated except that, in place of $$Sb(C_2H_5)_4BrAl_2(C_2H_5)_5Br$$

the complex $$Sb(C_2H_5)_3(i—C_4H_9)ClAl(i—C_4H_9)_5Cl$$

synthesized according to the process disclosed in the body of the present specification, was employed. The analytical values and physical properties of said complex were as follows—

Analytical values:

|  | Sb | Al | C | H | Cl |
|---|---|---|---|---|---|
| Calc'd (percent) | 18.00 | 7.98 | 53.26 | 10.28 | 10.48 |
| Found (percent) | 18.64 | 8.07 | 52.25 | 10.21 | 10.74 |

Physical properties: $D_4^{35}$, 1.066; $n_D^{35}$, 1.4880.

This polymerization yielded 19.5 g. of white powdery polymer. Its n-heptane extraction residue was 91.3% and its intrinsic viscosity was 8.56.

*Example 9*

The same polymerization of propylene as in Example 7 was repeated except that, instead of $$Sb(C_2H_5)_4BrAl_2(C_2H_5)_5Br$$

the complex $$Sb(C_2H_5)_3(C_6H_{13})ClAl_2(C_2H_5)_3(C_6H_{13})_2Cl$$

synthesized according to the process described in the body of the present specification, was employed. The analytical values and physical properties of said complex were as follows—

Analytical values:

|  | Sb | Al | C | H | Cl |
|---|---|---|---|---|---|
| Calc'd (percent) | 18.00 | 7.98 | 53.26 | 10.28 | 10.48 |
| Found (percent) | 18.35 | 7.68 | 52.28 | 10.45 | 11.10 |

Physical properties: $D_4^{35}$, 1.034; $n_D^{35}$, 1.4872.

20.0 g. of a white powdery polymer was obtained and its n-heptane extraction residue was 91.5%, while its intrinsic viscosity was 9.24.

*Example 10*

The same polymerization of propylene as in Example 7 was effected except that, in place of $$Sb(C_2H_5)_4BrAl_2(C_2H_5)_5Br$$

the complex $Sb(C_2H_5)_4ClAl_2(C_2H_5)_3(i—C_4H_9)_3$, synthesized according to the process described in the body of the present specification, was employed. The analytical values and physical properties of said complex were as follows—

Analytical values:

|  | Sb | Al | C | H | Cl |
|---|---|---|---|---|---|
| Calc'd (percent) | 20.87 | 9.21 | 53.29 | 10.67 | 6.05 |
| Found (percent) | 20.85 | 9.56 | 53.70 | 10.59 | 6.80 |

Physical properties: $D_4^{35}$, 1.027; $n_D^{35}$, 1.4922.

19.3 g. of white powdery polymer was obtained, and its n-heptane extraction residue was 93.2%, while its intrinsic viscosity was 9.35.

*Example 11*

The same polymerization of propylene as in Example 7 was conducted except that, instead of $$Sb(C_2H_4)_4BrAl_2(C_2H_5)_5Br$$

the complex $Sb(C_2H_5)_4ClAl_2(C_2H_5)_3(C_6H_{13})_3$, synthesized according to the process described in the present specification was used. The analytical values and physical properties were as follows—

Analytical values:

|  | Sb | Al | C | H | Cl |
|---|---|---|---|---|---|
| Calc'd (percent) | 18.17 | 8.05 | 57.36 | 11.13 | 5.29 |
| Found (percent) | 18.48 | 8.10 | 57.29 | 11.42 | 4.75 |

Physical properties: $D_4^{35}$, 0.989; $n_d^{35}$, 1.4876.

19.0 g. of white powdery polymer was obtained, and its n-heptane extraction residue was 96.6%, while its intrinsic viscosity was 8.72.

*Example 12*

0.5 mole of high purity butene-1 was polymerized according to the process and the polymerization conditions adopted in Example 7 except that, in place of $$Sb(C_2H_5)_4BrAl_2(C_2H_5)_5Br$$

there was employed the complex used in Example 3, i.e., $Sb(C_2H_5)_4ClAl_2(C_2H_5)_6$, while maintaining the polymerization temperature at 90° C. The polymerization was continued for 15 hours to obtain 20.0 g. of white solid polymer. The ether extraction residue of the resulting polymer reached 79.3% and the intrinsic viscosity showed a value of 3.18.

*Example 13*

0.3 mole of high purity styrene was polymerized in accordance with the same method and the polymerization conditions as shown in Example 7, except that the complex employed in Example 1, i.e., $Sb(C_2H_5)_4ClAl_2(C_2H_5)_5Cl$, was used in place of $Sb(C_2H_5)_4BrAl_2(C_2H_5)_5Br$, while maintaining the polymerization temperature at 70° C.

The polymerization was continued for 15 hours to obtain 20 g. of white solid polymer. The polymer thus obtained was recognized to be highly crystalline according to X-ray diffraction.

Example 14

In a 20 cc. glass ampoule, 0.3 m. mole of finely powdered TiCl and 0.7 m. mole of the complex $$Sb(C_2H_5)_4ClAl_2(C_2H_5)_6$$

employed in Example 3, were sealed together with 7 cc. of cyclohexane under dried oxygen-free nitrogen atmosphere. This ampoule was placed in a 300 cc. stainless steel shaking type autoclave, which was closed after the addition of 150 cc. of purified dried cyclohexane. After evacuating, the autoclave was heated to 90° C. into which a high purity propylene was introduced under pressure so as to maintain the partial pressure at 10 kg./cm.² and the ampoule was broken, whereby the polymerization was continued for 2 hours while shaking the autoclave. The resulting polymerization product was treated according to Example 1 to obtain 30 g. of white powdery polymer. The polymer obtained showed the n-heptane extraction residue of 87.3% and the intrinsic viscosity of 5.32.

Example 15

In a 20 cc. glass ampoule, 1.0 m. mole of finely powdered TiCl₃ and 0.7 m. mole of the complex employed in Example 3, i.e., Sb(C₂H₅)₄ClAl₂(C₄H₅)₆, were sealed together with 7 cc. of n-heptane. This ampoule was put in a 300 cc. stainless steel shaking type autoclave, which was closed after the addition of 150 cc. of purified and dried n-heptane. After cooling to −80° C. and evacuating, the autoclave was heated to 55° C. into which a high purity propylene was introduced under pressure so as to maintain the partial pressure at 1.0 kg./cm.², and the ampoule was broken, whereby the polymerization was continued for 5 hours while shaking the autoclave. The resulting polymerization product was treated according to the process shown in Example 1 to obtain 35 g. of white powdery polymer. The n-heptane extraction residue of this polymer was 94.2% while its intrinsic viscosity was 5.46.

Example 16

Into a 30 l. stainless steel reactor provided with a stirrer, 15 l. of xylene was introduced. Subsequently, 6.75 g. of finely powdered titanium trichloride and 20 g. of the complex employed Example 3, i.e., $$Sb(C_2H_5)_4ClAl_2(C_2H_5)_6$$

were added to the reactor. Then, high purity propylene was introduced under pressure into the reactor so as to maintain the partial pressure at 3.0 kg./cm.² and the polymerization was carried out at 55° C. for 3 hours while agitating. After the polymerization, methanol was charged into the reactor to decompose the residual catalyst. The resulting white powdery polymer was washed with methanol and water and dried to obtain 3.0 kg. of white powdery polymer. The polymerization rate was 150 g. per hour per gram of titanium trichloride. The n-heptane extraction residue of the polymer obtained was 93.9%, while the intrinsic viscosity thereof showed 8.37.

When the thus obtained powdery polymer was subjected to melt-spinning after pelletizing by suitable means, it showed a favorable extrudability. Also, woven fabrics from thus extruded fiber had excellent touch and feeling.

Example 17

Into a 300 cc. stainless steel autoclave, 150 cc. of n-hexane was charged, and then 2.5 m. mole of finely divided titanium trichloride, obtained by reducing titanium tetrachloride with hydrogen, was introduced under dried oxygen free nitrogen atmosphere. Subsequently, the complex Sb(C₂H₅)₄IAl(C₂H₅)₃, synthesized according to the process disclosed in the body of the present specification, was charged into the autoclave, which was then closed. The above-mentioned complex was colorless liquid having the following analytical value:

|  | Sb | Al | I | C | H |
|---|---|---|---|---|---|
| Calc'd (percent) | 24.38 | 5.54 | 27.06 | 34.50 | 8.26 |
| Found (percent) | 25.42 | 5.64 | 26.49 | 35.10 | 7.36 |

The resulting mixture was stirred for 5 minutes at room temperature and cooled to −80° C. After evacuating the autoclave, 0.5 mole of high purity propylene was charged therein. Subsequently, the autoclave was heated to 60° C. and the polymerization was carried out for 5 hours while shaking the autoclave. The polymerization pressure showed 6.3 kg./cm.² at first but completely lowered in 3 hours. Basing upon the variation of the polymerization pressure, quantity of the produced polymer per gram of TiCl₃ in case of partial pressure of propylene had been kept at 3 kg./cm.² was calculated as high value as 170 g. The resulting polymerization product was treated with 500 cc. of methanol, boiled in 30% hydrochloric acid-methanol, washed with water and dried to obtain 19 g. of white powdery polymer. The n-heptane extraction residue of the polymer obtained was 90.0% and intrinsic viscosity in its tetraline solution at 135° C. was 5.56 (g./100 cc.)⁻¹.

Example 18

In two 10 cc. glass ampoules, 2.5 m. moles of finely powdered TiCl₃ and 2.5 m. moles of the complex $$Sb(C_2H_5)_4ClAl(C_2H_5)_3$$

synthesized according to the process disclosed in the body of the present specification were sealed, respectively, under dried oxygen free nitrogen atmosphere. The above-mentioned complex was colorless liquid having the following analytical values:

|  | Sb | Al | Cl | C | H |
|---|---|---|---|---|---|
| Calc'd (percent) | 31.41 | 6.96 | 9.15 | 43.38 | 9.10 |
| Found (percent) | 31.47 | 6.90 | 9.35 | 42.59 | 9.12 |

The aforesaid ampoules were placed in a 300 cc. stainless steel autoclave, into which was then introduced 150 cc. of purified and dried xylene. After evacuating the autoclave, 0.5 mole of high purity propylene was condensed. Subsequently, the autoclave was heated to 60 C. and the ampoules were broken to initiate the polymerization. The polymerization was continued for 5 hours to obtain 20 g. of white powdery polypropylene. The n-heptane extraction residue of the polymer produced was 92.2%, and the intrinsic viscosity thereof in tetraline solution at 135° C. was 7.64.

Example 19

The same polymerization of propylene as in Example 17 was carried out at 15° C. for 15 hours, employing the complex Sb(S₂H₅)₄ClAl(C₂H₅)₂Cl in place of $$Sb(C_2H_5)_4IAl(C_2H_5)_3$$

This complex was colorless liquid having the following analytical values:

|  | Sb | Al | Cl | C | H |
|---|---|---|---|---|---|
| Calc'd (percent) | 30.90 | 6.85 | 18.00 | 36.58 | 7.67 |
| Found (percent) | 31.16 | 6.61 | 19.09 | 35.59 | 7.57 |

In this case also white powdery polymer was obtained quantitatively. Its n-heptane extraction residue was 96.7% and its intrinsic viscosity in tetraline solution at 135° C. was 10.0.

Example 20

The same polymerization of propylene as in Example 17 was conducted except that the complex $$Sb(C_4H_9)_3(C_2H_5)BrAl(C_3H_7)_3$$

was employed in place of $Sb(C_2H_5)_4IAl(C_2H_5)_3$. The said complex was colorless liquid having the following analytical values:

|                 | Sb    | Al   | Br    | C     | H    |
|-----------------|-------|------|-------|-------|------|
| Calc'd (percent) | 21.81 | 4.83 | 14.31 | 49.48 | 9.58 |
| Found (percent)  | 21.80 | 4.58 | 13.93 | 49.00 | 9.25 |

In this case also white powdery polymer was obtained quantitatively, and its n-heptane extraction residue was 85%, while its intrinsic viscosity in tetraline solution at 135° C. was 7.38.

Example 21

In two 10 cc. glass ampoules, 2.5 m. molds of finely powdered ttanium trichloride (corresponding to $$(TiCl_3)_3AlCl_3)$$

obtained by reducing titanium tetrachloride with metallic Al and 5.0 m. moles of the complex $$Sb(C_2H_5)_4ClAl(C_2H_5)Cl_2$$

synthesized according to the process described in the body of the present specification, were sealed separately. This complex was white crystals (M.P. 34°–36° C.) having the following analytical values:

|                 | Sb    | Al   | Cl    | C     | H    |
|-----------------|-------|------|-------|-------|------|
| Calc'd (percent) | 30.41 | 6.74 | 26.57 | 29.97 | 6.29 |
| Found (percent)  | 29.69 | 6.59 | 26.90 | 28.49 | 5.96 |

The aforesaid ampoules were placed in a 300 cc. stainless steel autoclave, which was then evacuated. Into the auoclave, 150 cc. of purified n-hexane was introduced and then 0.5 mole of high purity propylene was charged. Subsequently, the autoclave was heated to 60° C. and shaken to break the ampoules, whereby the polymerization was carried out for 15 hours. The resulting polymerization product was treated by the same methods as in Example 1 to obtain 17.5 g. of white powdery polymer. The n-heptane extraction residue of the polymer showed a value of as high as 94.3% and the intrinsic viscosity thereof in tetraline solution at 135° C. was 13.8.

Example 22

In two pieces of 10 cc. glass ampoules, 5.0 m. moles of finely powdered $TiCl_3$ obtained by reducing $TiCl_4$ with aluminum metal and 5.0 m. moles of $$Sb(C_2H_5)_4ClAl_2(C_2H_5)_5Cl$$

employed in Example 1, were sealed separately under oxygen-free nitrogen atmosphere. These ampoules were put in a 300 cc. stainless steel autoclave, to which was then introduced 150 cc. of purified and dried n-hexane. After evacuating the autoclave, 30 g. of high purity 3-methyl-butene-1 was charged therein. The autoclave was then heated to 70° C. and the ampoules were broken to start the polymerization. After 15 hours polymerization while shaking the autoclave, the polymerization product was treated by the same methods as described in Example 1 to obtain 30 g. of white powdery polymer. The n-heptane extraction residue of said polymer was 94%.

Example 23

Exactly the same polymerization as in Example 22 was carried out except that 4-methyl-pentene-1 was employed instead of 3-methyl-butene-1 to obtain 20 g. of white powdery polymer. The n-heptane extraction residue of said polymer was 90%.

Referential example

Exactly the same polymerization of propylene as in Example 3 was repeated except that 5.0 m. moles of $Al(C_2H_5)_3$ was used in place of 2.5 m. moles of $$Sb(C_2H_5)_4ClAl_2(C_2H_5)_6$$

The n-heptane extraction residue of the resulting white powdery polymer was 65.5% while the intrinsic viscosity thereof was 3.05.

What we claim is:

1. A method for producing a poly-α-olefin which comprises polymerizing an α-olefin selected from the group consisting of propylene, butene-1, pentene-1, 3-methyl-butene-1, 4-methyl-pentene-1 and styrene, in the presence of a catalyst prepared by reacting (A) titanium trichloride with (B) one organo-metallic complex selected from the group consisting of:

(1) $SbR_4XAl_2R'_6$, wherein X represents one member selected from the group consisting of Cl and Br; R represents an ethyl group; and R' represents an alkyl group having 2 to 6 carbon atoms and the number of the alkyl group having at least 4 carbon atoms is limited to at most 3, (2) $SbR_3''XAl_2R'_5X'$, wherein X and X' represent respectively members selected from the group consisting of Cl and Br; R represents an ethyl group; R' represents an alkyl group having 2 to 6 carbon atoms and the number of the alkyl group having at least 5 carbon atoms is limited to at most 2; and R'' represents an alkyl group having 2 to 6 carbon atoms, (3) $SbR_4XAlR'_nX'_{3-n}$, wherein X and X' represent respectively members selected from the group consisting of Cl, Br and I; R and R' represent respectively alkyl groups having 1 to 6 carbon atoms; and $n$ is an integer between 1 and 3, the mole ratio of said organo metallic complex to titanium trichloride being 0.1–10:1.

2. A method according to claim 1, wherein the organo-metallic complex of $SbR_4XAl_2R'_6$ is selected from the group consisting of:

$Sb(C_2H_5)_4ClAl_2(C_2H_5)_6$
   $Sb(C_2H_5)_4BrAl_2(C_2H_5)_6$
   $Sb(C_2H_5)_4ClAl_2(i-C_3H_7)_6$
   $Sb(C_2H_5)_4ClAl_2(C_2H_5)_3(i-C_3H_7)_3$
   $Sb(C_2H_5)_4ClAl_2(C_2H_5)_3(C_6H_{13})_3$, and
   $Sb(C_2H_5)_4ClAl_2(C_2H_5)_3(i-C_4H_9)_3$.

3. A method according to claim 1, wherein the organo-metallic complex of $SbR_3''XAl_2R'_5X'$ is selected from the group consisting of:

$Sb(C_2H_5)_4ClAl_2(C_2H_5)_5Cl$
   $Sb(C_2H_5)_4BrAl_2(C_2H_5)_5Cl$
   $Sb(C_2H_5)_4BrAl_2(C_2H_5)_5Br$
   $Sb(C_2H_5)_3(i-C_3H_7)ClAl_2(i-C_3H_7)_5Cl$, and
   $Sb(C_2H_5)_3(C_6H_{13})ClAl_2(C_2H_5)_3(C_6H_{13})_2Cl$.

4. A method according to claim 1, wherein the organo-metallic complex of $SbR_4XAlR_nX'_{3-n}$ is selected from the group consisting of:

$Sb(C_2H_5)_4IAl(C_2H_5)_3$
   $Sb(C_2H_5)_4ClAl(C_2H_5)_3$, and
   $Sb(C_4H_9)_3(C_2H_5)BrAl(C_3H_7)_3$.

5. A method according to claim 1, wherein the polymerization is effected in the polymerization medium selected from the group consisting of n-heptane, benzene, xylene and cyclohexane.

6. A method according to claim 1, wherein the polymerization is carried out at a temperature between 40° C. and 80° C. while maintaining the partial pressure of the olefin at 1 to 10 atm.

7. A method according to claim 1, wherein highly crystalline polypropylene is produced by polymerizing propylene in the presence of a catalyst comprising 1 mole of titanium trichloride and 2 moles of $$Sb(C_2H_5)_4ClAl_2(C_2H_5)_6$$

8. A method according to claim 1, wherein highly crystalline polypropylene is produced by polymerizing propylene in the presence of a catalyst comprising 1 mole of titanium trichloride and 2 moles of $$Sb(C_2H_5)_4ClAl_2(C_2H_5)_5Cl$$

9. A method according to claim 1, wherein highly crystalline polypropylene is produced by polymerizing propylene in the presence of a catalyst comprising 1 mole of titanium trichloride and 2 moles of $$Sb(C_2H_5)_4ClAl(C_2H_5)Cl_2$$

10. A method according to claim 1, wherein highly crystalline polybutene-1 is produced by polymerizing butene-1 in the presence of a catalyst comprising 1 mole of titanium trichloride and 2 moles of $$Sb(C_2H_5)_4ClAl_2(C_2H_5)_6$$

11. A method according to claim 1, wherein highly crystalline polystyrene is produced by polymerizing styrene in the presence of a catalyst comprising 1 mole of titanium trichloride and 2 moles of $$Sb(C_2H_5)_4ClAl_2(C_2H_5)_5Cl$$

12. A method according to claim 1, wherein 3-methylbutene-1 is polymerized.

13. A method according to claim 1, wherein 4-methylpentene-1 is polymerized.

14. A catalyst which consists essentially of the reaction product of titanium trichloride and one organometallic complex selected from the group consisting of:

(1) $SbR_4XAl_2R'_6$,
  wherein X represents one member selected from the group consisting of Cl and Br; R represents an ethyl group; and R' represents an alkyl group having 2 to 6 carbon atoms and the number of the alkyl group having at least 4 carbon atoms is limited to at most 3, (2) $SbR_3''XAl_2R'_5X'$,
  wherein X and X' represent respectively members selected from the group consisting of Cl and Br; R represents an ethyl group; R' represents an alkyl group having 2 to 6 carbon atoms and the number of the alkyl group having at least 5 carbon atoms is limited to at most 2; and R'' represents an alkyl group having 2 to 6 carbon atoms, and (3) $SbR_4XAlR'_nX'_{3-n}$,
  wherein X and X' represent respectively members selected from the group consisting of Cl, Br and I; R and R' represent respectively alkyl groups having 1 to 6 carbon atoms; and $n$ is an integer of 1, 2 and 3, the mole ratio of said organo-metallic complex to titanium trichloride being 0.1–10:1.

References Cited by the Examiner

UNITED STATES PATENTS

| | | | |
|---|---|---|---|
| 3,058,963 | 10/1962 | Vandenberg | 260—94 |
| 3,081,287 | 3/1963 | Cover et al. | 252—429 |
| 3,118,865 | 1/1964 | Bruce et al. | 252—429 |

FOREIGN PATENTS 233,098  3/1961  Australia.

JOSEPH L. SCHOFER, *Primary Examiner.*

JAMES A. SEIDLECK, HARRY WONG, *Examiners.*